Patented Oct. 26, 1937

2,097,276

UNITED STATES PATENT OFFICE 2,097,276

PROCESS FOR DYEING LEATHER

Joseph Gyr, Basel, Switzerland, assignor to Society of Chemical Industry in Basle, Basel, Switzerland, a Swiss firm No Drawing. Application December 8, 1933, Serial No. 701,567. In Switzerland December 21, 1932

6 Claims. (Cl. 8—5)

According to this invention leather is dyed in fast colors and the dyestuffs used are complex copper compounds of azo-dyestuffs of the general formula $$R_1-N=N-R_2-N=N-R_3$$

wherein $R_1$ is the radical of a diazo-compound containing lake-forming groups, $R_2$ is a phenyl radical containing at least two hydroxyl-groups, and $R_3$ is the radical of a diazo-azo-compound, the diazo-group in which belongs to a monoaryl-radical.

For making azo-dyestuffs of the above general formula, the copper compounds of which are to be used in this invention, there come into consideration as diazo-compounds containing lake-forming groups ($R_1$) the diazo-compounds of the benzene and naphthalene series, which contain in ortho-position to the diazo-group a hydroxyl-, carboxyl- or alkoxy group or which contain a salicylic acid-grouping. Such diazo-compounds comprise, for example, the diazo-compounds of the ortho-aminophenols, ortho-aminonaphthols, ortho-aminoalkoxybenzenes, ortho-aminoalkoxynaphthalenes, anthranilic acids, ortho-aminonaphthalene-carboxylic acids, amino-salicylic acids, and the sulfonic acids and nitro-, alkyl- and halogen-substitution products of these compounds. As compounds which represent a phenyl-radical containing at least two hydroxyl-groups ($R_2$), there come into consideration, for example, 1:3-dihydroxybenzene, 1:3-dihydroxybenzene-4-carboxylic acid, 1:3-dihydroxybenzene-5-carboxylic acid, 1:2:3-trihydroxybenzene-5-carboxylic acid, as well as sulfonic acids and nitro-, alkyl- and halogen-substitution products thereof, so far as these are suitable for coupling twice. Finally, for making azo-dyestuffs of the above general formula there may be used as diazoazo-compounds the diazo-group of which belongs to a monoaryl-radical ($R_3$), such as, for example, a monophenyl- or mononaphthyl-radical, for instance 4-diazoazobenzene-4'-sulfonic acid, 3:2'-dimethyl-4-diazoazobenzene-4'-sulfonic acid, 4'-hydroxy-4-diazoazobenzene-3'-carboxylic acid, 4-nitro-1-aminobenzene-azo-1-diazo-8-hydroxynaphthalene-3:6-disulfonic acid, 4-diazo-3-methoxy-azobenzene-3'-sulfonic acid, aminobenzene-azo-1-diazonaphthalene-6-(7)-sulfonic acid and 4-nitro-1-aminobenzene-azo-1-diazonaphthalene-6-sulfonic acid, and further substitution products of these compounds, such as, for example, halogen-substitution products.

In the manufacture of the azo-dyestuffs of the above general formula by action of the diazo-compounds on the coupling components, the coupling may follow in any order and, in accordance with the selected order and the nature of the diazo-compound, may be caused to occur in neutral, acid or alkaline medium, for instance a medium containing sodium carbonate, sodium bicarbonate, alkaline earth, caustic alkali, ammonia, pyridine, acetic acid or hydrochloric acid. So also, the copper compounds of the dyestuffs thus obtained may be made by treatment of the dyestuffs with various agents that yield copper, for instance copper sulfate, copper chloride, tetrammine-cupric sulfate or copper acetate, if desired in the presence of organic bases, such as pyridine. The agent yielding copper may be brought into action upon the monoazo-dyestuff containing lake-forming groups or on a finished polyazo-dyestuff. Furthermore, the dyestuff may be treated with the agent yielding copper, either in the dye-bath or in the course of the manufacture of the dyestuff.

The cupriferous azo-dyestuffs of this invention dye leather, tanned in any manner, uniform brown to brown-velvet to black-brown tints. The dyeings are very fast to acid and alkali and excellently fast to light.

The following examples illustrate the invention:—

*Example 1*

Neutralized chrome leather (box-willow calf, chrome sides, glazed kid, full chrome sheep) are tumbled in the cask in 3–4 times their weight of water at 60° C. During the rotation there is added, through the hollow axle, a solution of the cupriferous dyestuff from the azo-dyestuff 2-diazo-1-hydroxybenzene-4-sulfonic acid→1:3-dihydroxybenzene←3:2'-dimethyl-4-diazoazobenzene-4'-sulfonic acid of the formula

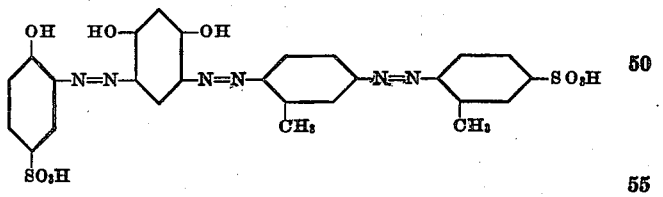

After 40 minutes the liquor is run off from the leather, which is then stuffed as usual.

The leather thus dyed has a very full, dull brown color, which is very fast.

Example 2

Well fulled vegetable-tanned sheep or goat skins are dyed in neutral condition as described in Example 1. At the end of the dyeing operation formic acid amounting to half the weight of the dyestuff used is added, whereupon dyeing is continued for 10 to 15 minutes. The goods are then rinsed.

The leather thus dyed has the same color as the leather dyed as described in Example 1.

It is also possible to dye the neutral leather by a brushing operation using cold liquor.

The following table comprises some of the dyestuffs applicable as parent materials for the production of the copper compounds for use in the invention, the color produced with aid of the copper compounds being given:—

| | I. Diazo-component ($R_1$) | Coupling-component ($R_2$) | II. Diazo-component ($R_3$) | Color obtained with the Cu-compound |
|---|---|---|---|---|
| 1 | 2-amino-1-hydroxybenzene-4-sulfonic acid | 1:3-dihydroxybenzene | 4-aminoazobenzene-4'-sulfonic acid | Reddish-brown. |
| 2 | ...do... | ...do... | Dehydrothio-toluidine-sulfonic acid-azo-1-amino-8-hydroxynaphthalene-3:6-disulfonic acid. | Do. |
| 3 | ...do... | ...do... | 4-nitro-1-aminobenzene-azo-1-amino-8-hydroxynaphthalene-3:6-disulfonic acid. | Do. |
| 4 | ...do... | ...do... | 4-amino-4'-hydroxyazobenzene-3'-carboxylic acid. | Do. |
| 5 | 2-amino-4:6-dinitro-1-hydroxybenzene | ...do... | 3:2'-dimethyl-4-aminoazobenzene-4'-sulfonic acid. | Do. |
| 6 | 2-amino-1-hydroxybenzene-4-sulfonic acid | ...do... | 4-amino-3-methoxy-azobenzene-3'-sulfonic acid. | Do. |
| 7 | 6-amino-4-sulfo-1-hydroxybenzene-2-carboxylic acid. | ...do... | 3:2'-dimethyl-4-aminoazobenzene-4'-sulfonic acid. | Do. |
| 8 | 2-amino-1-hydroxybenzene-4-sulfonic acid | ...do... | Aminobenzene-azo-1-aminonaphthalene-6-(7)-sulfonic acid. | Violet-brown. |
| 9 | ...do... | ...do... | 4-nitro-1-aminobenzene-azo-1-aminonaphthalene-6-sulfonic acid. | Do. |
| 10 | 4:6-dinitro-2-amino-1-hydroxybenzene | 1:3-dihydroxybenzene-4-carboxylic acid. | 4-amino-4'-hydroxyazobenzene-3'-carboxylic acid. | Brown. |

The formulas of the azo-dyestuffs of the above table are the following:—

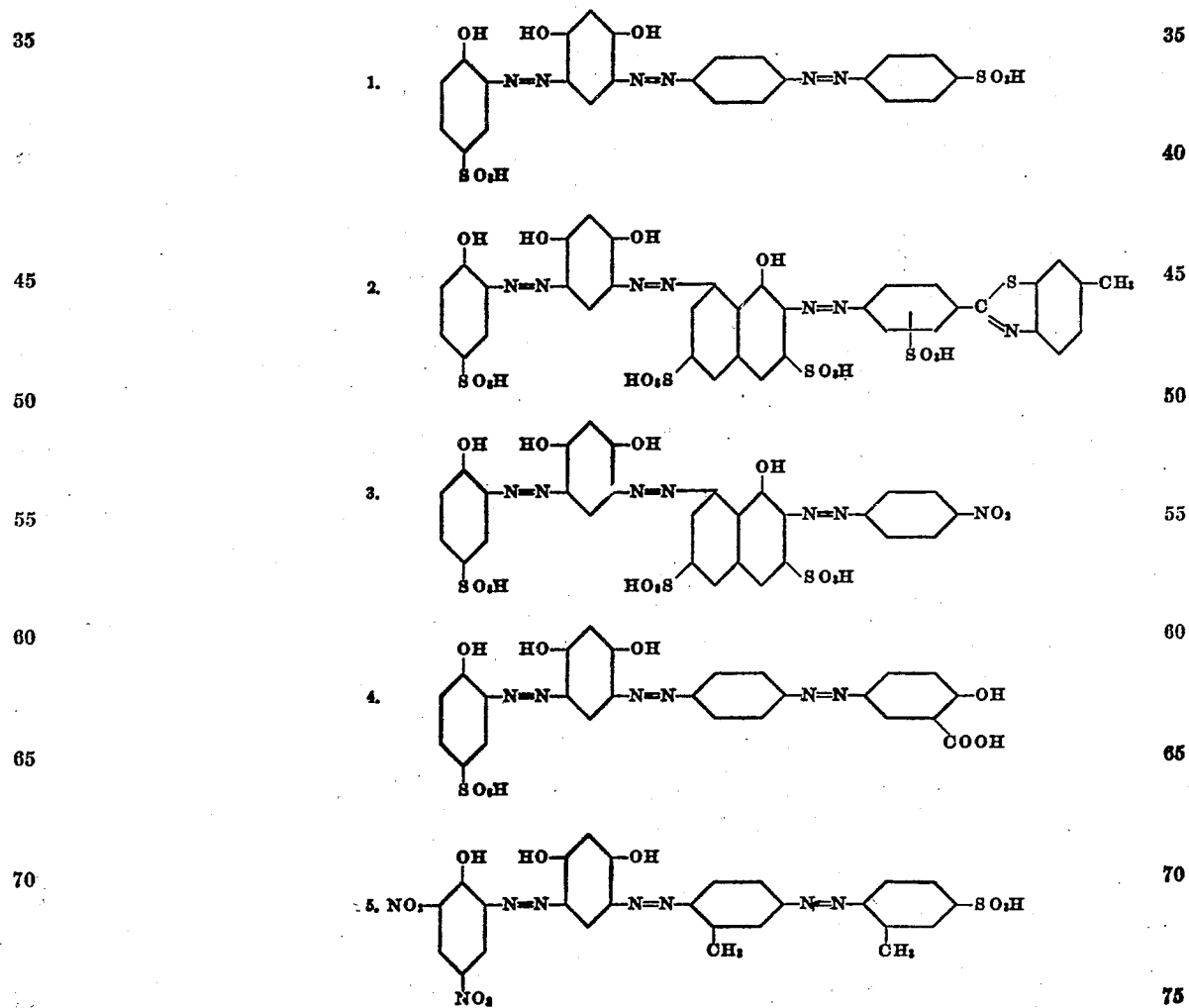

6. 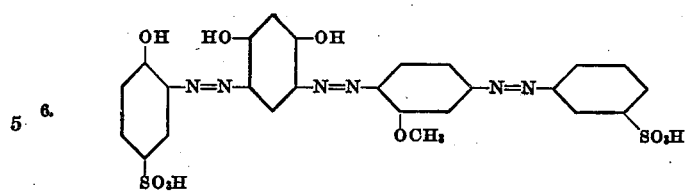

7. 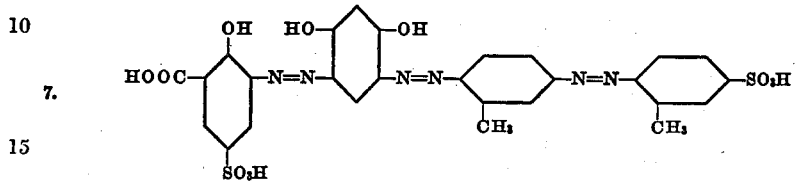

8. 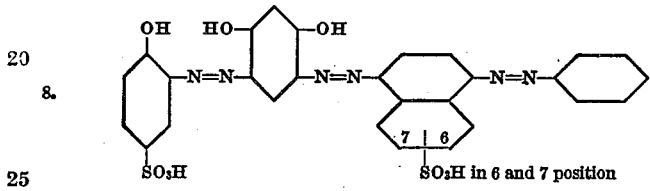

$SO_3H$ in 6 and 7 position

9. 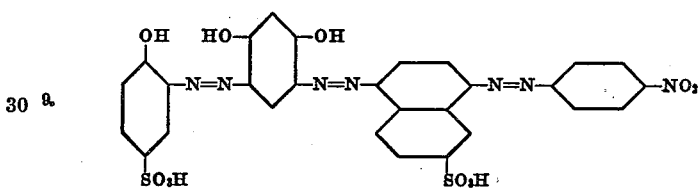

10. 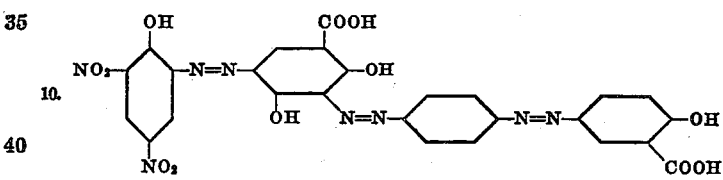

What I claim is:—

1. The process of dyeing leather, comprising using the complex copper compounds of azo-dyestuffs of the general formula

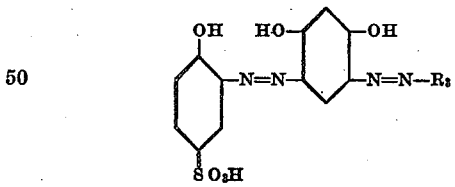

wherein $R_3$ is the radical of a diazoazo-compound, in which the diazo-group belongs to a monophenyl-radical, which copper compounds are brown to dark colored powders dyeing leather fast brown to brown-violet to black-brown tints.

2. The process of dyeing leather, comprising using the complex copper compound of the azo-dyestuff of the formula

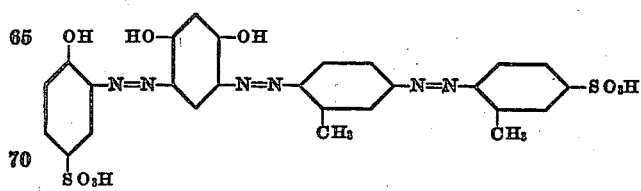

which product is a brown powder dyeing leather fast brown tints.

3. The process of dyeing leather, comprising using the complex copper compounds of azo-dyestuffs of the general formula

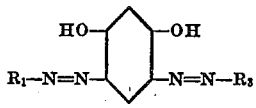

wherein $R_1$ is the radical of an ortho-diazophenol containing an $SO_3H$ group in para position to the OH group, and $R_3$ is the radical of a diazoazo-compound in which the diazo group belongs to a monoaryl radical.

4. The complex copper compounds of the trisazo-dyestuffs of the general formula

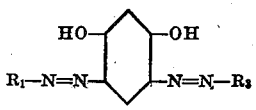

wherein $R_1$ is the radical of an ortho-diazophenol containing an $SO_3H$ group in para position to the OH group, and $R_3$ is the radical of a diazoazo-compound in which the diazo group belongs to a monoaryl radical, said compounds being capable of dyeing leather brownish tints.

5. The complex copper compounds of the trisazodyestuffs of the general formula

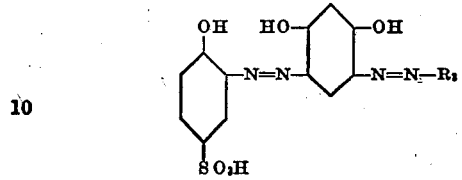

wherein R₃ is the radical of a diazoazo-compound in which the diazo group belongs to a mono- phenyl radical, said compounds being capable of dyeing leather brownish tints.

6. The complex copper compound of the trisazodyestuff of the formula

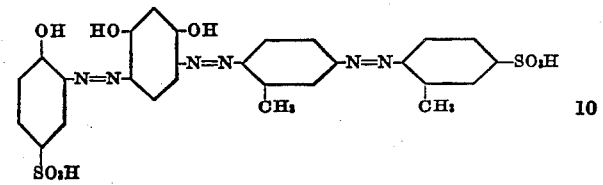

which compound dyes leather brown.

JOSEPH GYR.